Figure 1:
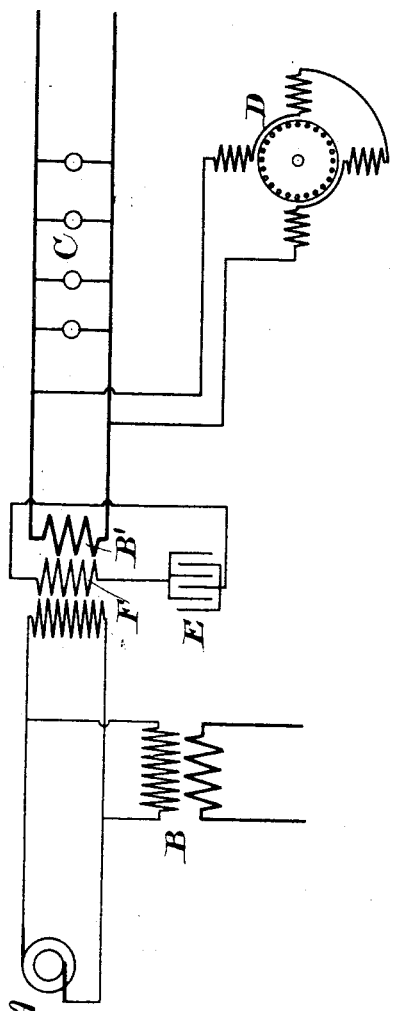

(No Model.) 2 Sheets—Sheet 1.

E. THOMSON & E. W. RICE, Jr.
MEANS FOR NEUTRALIZING SELF INDUCTION IN ALTERNATING CIRCUITS.

No. 513,349. Patented Jan. 23, 1894.

WITNESSES.
A. F. Macdonald.
[signature]

INVENTORS.
Elihu Thomson
Edwin Wilbur Rice Jr.
By Bentley & Blodgett
Attys.

(No Model.) 2 Sheets—Sheet 2.
E. THOMSON & E. W. RICE, Jr.
MEANS FOR NEUTRALIZING SELF INDUCTION IN ALTERNATING CIRCUITS.
No. 513,349. Patented Jan. 23, 1894.
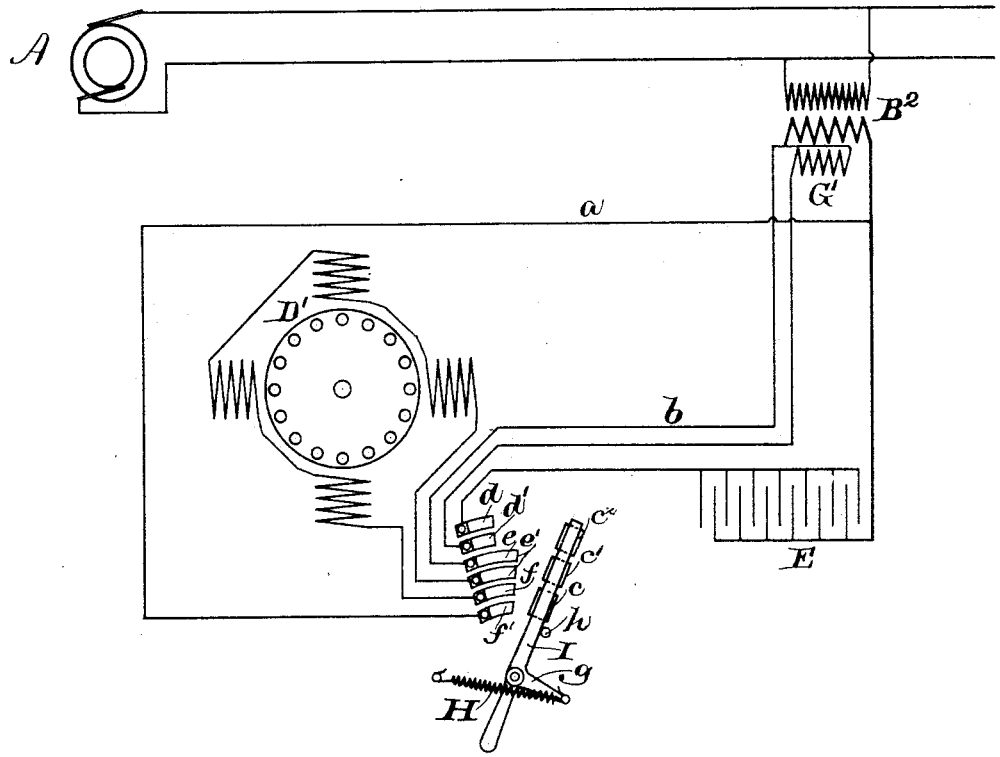
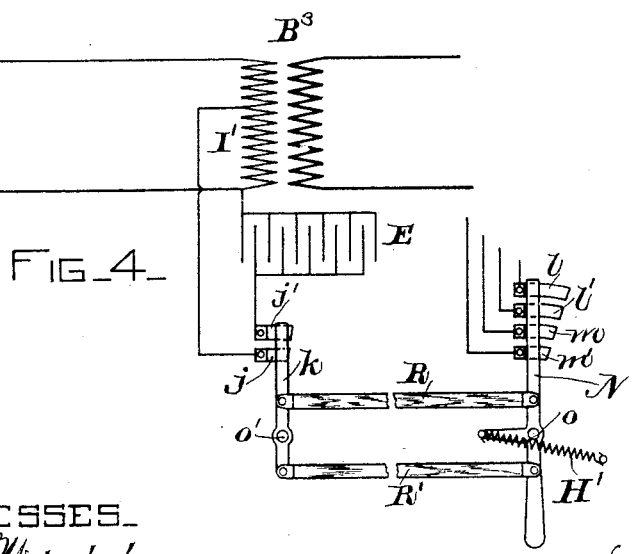
WITNESSES
Henry Westendarp.
John H. Gibboney.
INVENTORS
Elihu Thomson and
Edwin Wilbur Rice Jr
By Bentley & Blodgett
Attys.

UNITED STATES PATENT OFFICE.

ELIHU THOMSON AND EDWIN W. RICE, JR., OF SWAMPSCOTT, MASSACHU-SETTS, ASSIGNORS TO THE GENERAL ELECTRIC COMPANY, OF NEW YORK.

MEANS FOR NEUTRALIZING SELF-INDUCTION IN ALTERNATING CIRCUITS.

SPECIFICATION forming part of Letters Patent No. 513,349, dated January 23, 1894.

Application filed September 1, 1893. Serial No. 484,583. (No model.)

*To all whom it may concern:*

Be it known that we, ELIHU THOMSON and EDWIN W. RICE, Jr., citizens of the United States, residing at Swampscott, county of Essex, and State of Massachusetts, have invented a certain new and useful Improvement in Means for Neutralizing Self-Induction in Alternating Circuits, of which the following is a specification.

Our present invention relates to certain means for neutralizing the self-induction in an alternating circuit by condensers or polarizing cells. When an induction or other motor, or, in fact, any translating device having considerable self-induction is run on an alternating circuit, the inductance tends to set up a displaced phase relation between the current and electromotive-force, the current "lagging" as it is called behind the electromotive-force. The transformers and the lines, especially when of considerable length, also contribute to this lag of the current, and accentuate the displacement of phase which gives rise to the generation of "idle" currents not available for useful work. It reduces the effective potential at the translating devices, and renders necessary a very large increase in the capacity of the generating plant in excess of that which would otherwise be necessary for the useful work done on the circuit. A motor will run on an alternating circuit only at a comparatively low efficiency unless the effect of its self-induction upon the current be counteracted, and it is impracticable to compound the generators for a variable load of lamps or like devices on the same circuit with the motor if any pronounced lag exists, as the losses in the line and transformers become so excessive. It has been proposed heretofore to connect a condenser in shunt around an electric motor running on an alternating circuit, or, when there are a number of motors, to shunt each motor by a separate condenser. Condensers in series rather than in shunt have been likewise suggested. When this is done the potential in the condenser circuit is practically the same as the working potential of the motor. This, however, is an undesirable arrangement because the potential in the secondary circuit of an alternating current system is usually so low that a very large condenser would be needed to give the required compensation, while the potential of the primary circuit is usually so high that a condenser may not be coupled in shunt thereto with safety.

One feature of the present invention consists in avoiding the difficulty of working with the condenser at the extreme potentials existing on the primary and secondary circuits, by placing the condenser in a separately transformed circuit wherein a convenient mean potential between that existing on the primary and secondary circuits is secured by proportioning the conductors so as to give the desired ratio of transformation. The condenser when so arranged will counteract or tend to counteract the lag of the current, and by making the capacity of the condenser correspond with the existing self-induction under any given load compensation may be secured not only for one motor but for any number of motors, or other translating devices whose self-induction tends to make the current lag. The preferred arrangement consists in winding the coil included in the condenser circuit on a single core with the primary and secondary windings of the main transformers so that the transformation for the secondary circuit and the condenser circuit is secured by the action of one common magnetic field.

Another feature of the invention comprises a switch by which the circuits of the condenser and of a motor or like translating device, the self-induction of which the condenser is to neutralize, may be opened or closed at will, but in such manner that the condenser circuit will be opened first so as to avoid rupture of the insulation of the condenser by the extra currents which are generated upon breaking the circuit of the motor, and which, as is well known, are of very high potential.

Figure 2:
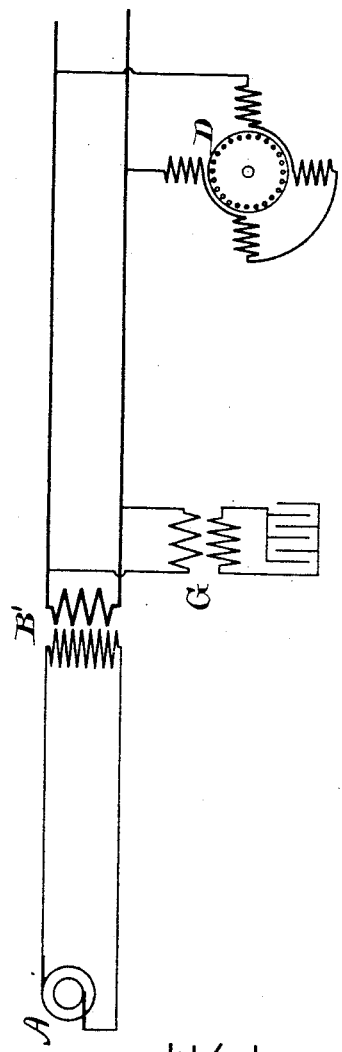

In the accompanying drawings illustrating the invention, Figures 1 and 2 are diagrammatic views showing different methods of arranging the condenser, and Figs. 3 and 4 show the switch forming part of the invention, and modified circuits for the condenser.

In the drawings an alternating current generator A is seen at the power station, leading directly to the primary or high potential circuit over which the energy is transmitted to the points where it is to be used. Transformers B, B', reducing the high potential of the primary circuit to the low potential necessary for the translating devices in the secondary circuit, have their primary and secondary conductors connected to the respective circuits in the usual manner. In the secondary circuit leading from transformer B' are shown electric lamps C coupled in multiple, and an induction motor whose inducing coils D are coupled in series in a shunt across the mains of the secondary circuit. The motor D has considerable self-induction, and this, as already explained, tends to displace the current in phase relatively to the electromotive-force making it lag. To counteract or neutralize this lag a condenser E is employed which, instead of being connected directly in shunt or series with the motor, is included in a separately transformed circuit wherein the potential is less than that in the primary and greater than that in the secondary. The arrangement which we prefer is that shown in Fig. 1 where the condenser is in circuit with a third winding F upon the same core with the main primary and secondary windings of the transformer. The coil F will be so proportioned as to give the desired potential in the condenser circuit. When arranged in this way the advanced current of the condenser acting inductively on the windings of the transformer will counteract the lag due to the self-induction of the motor D, and such other causes as have a similar retarding influence upon the main current. In this manner the current may be maintained in practical harmony with the electromotive-force. Polarizing cells may be used instead of the condenser and will neutralize the impedance or lag of the current in a similar manner.

In Fig. 2 the general arrangement of the distribution system is the same as in Fig. 1, and like letters have been used to refer to corresponding parts. This figure, however, shows the condenser connected inductively with the secondary circuit through an entirely distinct transformer G, the primary of which is connected in shunt across the secondary mains, and whose secondary is so proportioned as to raise the potential in the condenser above that in the secondary circuit.

In Fig. 3 A is an alternating current generator as before, connected to primary mains leading to a transformer B². The inducing coils of an induction motor D' are connected in a shunt across the secondary circuit of this transformer by conductors $a$ and $b$ leading from opposite sides of the transformer to the terminals of the motor. The condenser E is here included in one of the mains of the secondary circuit, and, in order to secure the desired increase of potential, there is also in the condenser circuit a supplementary coil G' wound on the same core with the coils of the main transformer, and properly proportioned to give the desired increase of potential. The circuits of the condenser and the motor are controlled by a switch lever I having contact blocks $c, c', c^2$ thereon which are insulated from one another, but which in one position of the lever bridge across terminals $d, d', e, e', f, f'$. The terminals $d, d'$ with which the switch breaks contact first are joined to opposite sides of the condenser circuit so that when the switch is opened the condenser circuit is broken, while the motor circuit remains for a further instant closed. In this way the extra currents of high potential which are generated when the motor circuit is opened are kept from entering the condenser, and endangering its insulation. A spring H is coupled to an arm $g$ of the lever I, and the tension of this spring acting over a dead center throws or snaps the switch so as to secure a quick make and break. The movement of the switch arm away from the terminals is limited by a stop $h$.

In Fig. 4 which shows still another modification, the circuit of the condenser E comprises such a portion of the primary coil I' of the main transformer B³ as will result in the desired potential in the condenser circuit. The condenser circuit is opened and closed at the contacts $j, j'$ which in one position of the switch are bridged by an arm $k$. The circuit of the motor is opened and closed at the contacts $l, l', m, m'$ which are connected to the terminals of the motor and the secondary mains in a manner corresponding to the contacts $e, e', f, f'$ in Fig. 3.

The switch in Fig. 4 comprises the arm N directly controlling the motor circuit and the arm $k$ directly controlling the condenser circuit. These arms respectively are pivoted at $o, o'$ and are connected together and insulated by parallel links R, R'. A spring H' secures a quick break as will be readily apparent from the illustration and the description of the similar spring in Fig. 3.

What we claim as new, and desire to secure by Letters Patent, is—

1. The combination of a motor or other translating device having considerable self-induction in an alternating circuit, with a condenser or equivalent self-induction neutralizer connected inductively with said circuit through a transformer having such a ratio of transformation that the potential in the condenser circuit is greater than that in the working circuit of the motor.

2. The combination in an alternating current system comprising high potential primary and low potential secondary circuits, of translating devices in the secondary circuit having considerable self-induction, with a condenser or equivalent self-induction neutralizer connected in the secondary of a separately transformed circuit of desired potential and inductively related to the main working circuit so that the condenser current counteracts, or tends to counteract, the lag of the main current, as set forth.

3. The combination in an alternating current system, of a transformer, and a condenser in circuit with a separate winding on the same core with the primary and secondary windings of the transformer and adapted to neutralize the lag of the current in the circuits to which the transformer is connected, as set forth.

4. The herein described means for counteracting the lag in an alternating circuit, consisting of a transformer having primary and secondary windings, and a condenser including in its circuit a conductor within and acted on inductively by the magnetic field of the transformer, as set forth.

5. The combination of a motor or like translating device having considerable self-induction, with a condenser for neutralizing the effect of such self-induction, and a switch controlling the condenser and motor circuits in such manner that the condenser circuit is opened before the motor circuit, as set forth.

In testimony whereof we have hereunto set our hands this 30th day of August, 1893.

ELIHU THOMSON.
EDWIN W. RICE, JR.

Witnesses;
JOHN W. GIBBONEY,
BENJAMIN B. HULL.